United States Patent
Huntington et al.

(10) Patent No.: US 11,252,359 B1
(45) Date of Patent: Feb. 15, 2022

(54) IMAGE COMPENSATION FOR SENSOR ARRAY HAVING BAD PIXELS

(71) Applicant: Allegro MicroSystems, LLC, Manchester, NH (US)

(72) Inventors: Andrew S. Huntington, Banks, OR (US); William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/352,829

(22) Filed: Jun. 21, 2021

(51) Int. Cl.
*H04N 5/367* (2011.01)
*H04N 5/232* (2006.01)

(52) U.S. Cl.
CPC ....... *H04N 5/3675* (2013.01); *H04N 5/23287* (2013.01)

(58) Field of Classification Search
CPC .............. H04N 5/3675; H04N 5/23287; G01S 17/003; G01S 17/88; G01S 17/86; G01S 17/00; G01S 17/894; G01S 7/003; G01S 7/4804; G01S 15/86; G01S 13/865; B60R 2300/301
USPC ........................................................ 348/246
See application file for complete search history.

(56) References Cited

U.S. PATENT DOCUMENTS

| | | | |
|---|---|---|---|
| 6,760,145 B1 | 7/2004 | Taylor et al. | |
| 6,778,728 B2 | 8/2004 | Taylor et al. | |
| 6,894,823 B2 | 5/2005 | Taylor et al. | |
| 6,989,921 B2 | 1/2006 | Bernstein et al. | |
| 7,015,780 B2 | 3/2006 | Bernstein et al. | |
| 7,160,753 B2 | 1/2007 | Williams, Jr. | |
| 7,244,367 B2 | 7/2007 | Bernstein et al. | |
| 7,432,537 B1 | 10/2008 | Huntington | |
| 7,504,053 B1 | 3/2009 | Alekel | |
| 7,764,719 B2 | 7/2010 | Munroe et al. | |
| 7,782,911 B2 | 8/2010 | Munroe et al. | |
| 7,852,549 B2 | 12/2010 | Alekel et al. | |
| 7,864,231 B2 * | 1/2011 | Sakamoto | H04N 5/2178 348/247 |
| 7,885,298 B2 | 2/2011 | Munroe | |
| 7,994,421 B2 | 8/2011 | Williams et al. | |
| 8,207,484 B1 | 6/2012 | Williams | |
| 8,319,307 B1 | 11/2012 | Williams | |
| 8,570,372 B2 | 10/2013 | Russell | |
| 8,597,544 B2 | 12/2013 | Alekel | |

(Continued)

FOREIGN PATENT DOCUMENTS

TW 201422772 6/2014

OTHER PUBLICATIONS

U.S. Appl. No. 17/197,314, filed Mar. 10, 2021, Taylor et al.

(Continued)

*Primary Examiner* — Pritham D Prabhakher
(74) *Attorney, Agent, or Firm* — Daly, Crowley, Mofford & Durkee, LLP

(57) ABSTRACT

Methods and apparatus for compensating for bad pixels in a sensor array. In embodiments, a detector system receives an image on a sensor array of pixels for a first frame via a lens when the lens and the sensor array are configured in a first positional relationship. The array includes at least one bad pixel. The system moves the lens and/or the sensor array based on a position of the at least one bad pixel in the image such that the lens and the sensor array are configured in a second positional relationship. The image on the sensor array for a second frame is received via the lens when the lens and the sensor array are configured in a second positional relationship. The system compensates for the location of the at least one bad pixel in the image for the first and second frames to output a processed image.

60 Claims, 9 Drawing Sheets

(56) References Cited

U.S. PATENT DOCUMENTS

| | | |
|---|---|---|
| 8,630,036 B2 | 1/2014 | Munroe |
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,288,408 B2 * | 3/2016 | Cieslinski ............ H04N 5/357 |
| 9,368,933 B1 | 6/2016 | Nijjar et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| 10,923,516 B2 * | 2/2021 | Terauchi ............ H04N 5/349 |
| 2004/0032516 A1 * | 2/2004 | Kakarala ............ H04N 9/07 348/246 |
| 2006/0007331 A1 * | 1/2006 | Izumi ............ H04N 5/367 348/246 |
| 2007/0171796 A1 * | 7/2007 | Tokuyama ............ G11B 7/0065 369/53.15 |
| 2008/0068474 A1 * | 3/2008 | Sakamoto ............ H04N 5/2178 348/247 |
| 2012/0176532 A1 * | 7/2012 | Hara ............ H04N 5/3696 348/352 |
| 2014/0340546 A1 * | 11/2014 | Cieslinski ............ H04N 5/367 348/246 |
| 2016/0073526 A1 * | 3/2016 | Chen ............ F16B 12/46 312/283 |
| 2018/0069367 A1 | 3/2018 | Villeneuve et al. |
| 2018/0176494 A1 * | 6/2018 | Sambonsugi ............ H04N 5/367 |
| 2018/0262705 A1 * | 9/2018 | Park ............ G06F 16/2322 |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |
| 2018/0316839 A1 * | 11/2018 | Nakata ............ H04N 5/23258 |
| 2019/0141268 A1 * | 5/2019 | Huang ............ H04N 9/045 |
| 2019/0296062 A1 * | 9/2019 | Terauchi ............ H04N 5/23229 |
| 2019/0310368 A1 | 10/2019 | LaChapelle |
| 2020/0336684 A1 * | 10/2020 | Wang ............ H04N 9/04557 |
| 2021/0258433 A1 * | 8/2021 | Otomaru ............ H04N 1/00824 |

OTHER PUBLICATIONS

U.S. Appl. No. 17/197,328, filed Mar. 30, 2021, Taylor et al.
U.S. Appl. No. 17/230,253, filed Apr. 14, 2021, Judkins, III et al.
U.S. Appl. No. 17/230,276, filed Apr. 14, 2021, Cadugan.
U.S. Appl. No. 17/230,277, filed Apr. 14, 2021, Judkins, III et al.

(56) References Cited

OTHER PUBLICATIONS

U.S. Appl. No. 17/352,937, filed Jun. 21, 2021, Cadugan et al.
U.S. Appl. No. 17/376,607, filed Jul. 15, 2021, Stewart et al.
U.S. Appl. No. 17/400,300, filed Aug. 12, 2021, Myers et al.
U.S. Appl. No. 17/402,065, filed Aug. 13, 2021, Lee et al.
Chen, et al., "A Fast Response MEMS Piezoelectric Microlens Actuator with Large Stroke and Low Driving Voltage," IEEE International Conference on Nano/Micro Engineered and Molecular Systems, Apr. 2018; 5 Pages.
Li, et al., "Integrated Tracking and Focusing Micro Lens Actuators Based on Silicon Bulk Micromachining," IEEE $16^{th}$ International Solid-State Sensors, Actuators and Microsystems Conference, Jun. 2011; pp. 1546-1549; 4 Pages.
Shen, et al., "A Novel Miniaturization Actuator Using a Symmetric Piezoelectric Pusher Element for Pocket Sun-Tracking System", IEEE 16th International Solid-State Sensors, Actuators and Microsystems Conference, Jun. 2011; pp. 482-485; 4 Pages.
Sindhanaiselvi, et al., "Investigation on Performance of Piezoelectric Beam Based MEMS Actuator for Focusing of Micro Lens in Mobile Application," IEEE International Conference on Circuits and Systems (ICCS), Jan. 2017; pp. 398-403; 6 Pages.

\* cited by examiner

IMAGE COMPENSATION FOR SENSOR ARRAY HAVING BAD PIXELS

BACKGROUND

As is known in the art, some known ranging systems can include laser radar (ladar), light-detection and ranging (lidar), and range-finding systems, to measure the distance to objects in a scene. A laser ranging and imaging system emits pulses toward a particular location and measures the return echoes to extract ranges to objects at the location, from which a three-dimensional representation of the objects can be computed.

Time-of-flight laser ranging systems generally work by emitting a laser pulse and recording the time it takes for the laser pulse to travel to a target, reflect, and return to a photoreceiver. The laser ranging instrument records the time of the outgoing pulse and records the time that a laser pulse returns. The difference between these two times is the time of flight to and from the target. Using the speed of light, the round-trip time of the pulses is used to calculate the distance to the target.

Photodetector arrays, such as a focal plane array (FPA), can be used to detect signal returns. As is known in the art, detector arrays typically have some number of bad pixels. For some conventional technologies, the manufacturing yield of conventional arrays having 100% operable pixels is near zero and the yield of arrays with 99.9% operable pixels is almost 100%. However, the presence of bad pixels prevents the acquisition of 100% of a scene in conventional detector systems.

SUMMARY

Example embodiments of the disclosure provide methods and apparatus for compensating for bad pixels in a sensor array. An image projected on a focal plane array (FPA) of photodetectors can be shifted in position with respect to the FPA on a frame-to-frame basis. Data from a first frame can be used to compensate for a bad pixel in a second frame. For example, data for bad pixels can be switched on alternate frames in order to use data from a good pixel for a different frame. A lens and/or FPA can be moved to shift the image location on the FPA in one or more axes. With this arrangement, an array with a few bad pixels can provide 100% imaging of a scene.

In one aspect, a method comprises: receiving an image on a sensor array of pixels for a first frame via an optic when the optic and the sensor array are configured in a first positional relationship, wherein the array of pixels includes at least one bad pixel; moving the optic and/or the sensor array based on a position of the at least one bad pixel in the array such that the optic and the sensor array are configured in a second positional relationship; receiving the image on the sensor array for a second frame via the optic when the optic and the sensor array are configured in a second positional relationship; and compensating for a lack of image data from the at least one bad pixel in the sensor array for the first and second frames to output a processed image.

A method can include one or more of the following features: dynamically updating a list of the at least one bad pixel, moving the optic and/or the sensor array based on a position of the at least one bad pixel in the array comprises viewing in a second frame a location in the image that was obscured by the bad pixel in a first frame, moving the optic and/or the sensor array comprises moving the optic with respect to the sensor array, moving the optic and/or the sensor array comprises moving the sensor array with respect to the optic, the sensor array comprises a focal plane array (FPA), the pixels comprise photosensitive diodes, compensating for a lack of image data from the at least one bad pixel in the first and second frames to output a processed image comprises updating information for the locations in the image obscured by the at least one bad pixel every other frame, the at least one bad pixel prevents collection of data from a first location in the image, and wherein the second positional relationship of the sensor array and the optic enables a good pixel to collect data for the first location in the image, moving the optic and/or the sensor array comprises shifting the image at least one pixel in a first axis, moving the optic and/or the sensor array comprises shifting the image at least one pixel in a first axis and at least one pixel in a second axis, the first and second axes are perpendicular, identifying the at least one bad pixel in the sensor array and storing locations of the identified bad pixels, the second positional relationship of the sensor array and the optic avoids locations in the image obscured by a first one of the bad pixels in a first frame from being blocked by different ones of the bad pixels in a second frame, compensating for a lack of image data from the at least one bad pixel in the first and second frames to output a processed image comprises minimizing mechanical movement of the optic and the sensor array between the first and second positional relationships, performing calibration with a calibration image to determine the second positional relationship of the lens and the sensor array, maximizing correlation of the image for the first and second frames based on the calibration image, generating an image shift vector based on locations of the at least one bad pixel and generating a list of good pixels that view areas of the image obscured by the at least one bad pixel in alternate frames, generating a first shift vector for good pixels that view the obscured locations in the image during even frames and generating a second shift vector for good pixels that view the obscured locations during odd frames, displaying for the location in the image obscured by the at least one bad pixel in the second frame, data obtained from a good pixel in the first frame, moving the optic and/or the sensor array such that the optic and the sensor array are configured in one or more additional positional relationships, collecting multiple frames of data for the image prior to moving the optic and/or the sensor array based to the second positional relationship, moving the optic and/or the sensor array using a piezoelectric actuator that translates the optic in a direction parallel to a surface of the sensor array, moving the optic and/or the sensor array using a MEMS actuator, the MEMS actuator moves the optic in multiple axes, the optic comprises a lens and a steering mirror, the steering mirror comprises a MEMS mirror, moving the steering mirror to change a focal length and/or optical path of the lens, a first region of the image is obscured by the at least one bad pixel in the first positional relationship and a second region of the image is obscured by the at least one bad pixel in the second positional relationship; and wherein compensating for the lack of image data further comprises: combining data from the sensor array of pixels for the first and second frames including using data for the first region of the image from the second frame and using data for the second region of the image from the first frame to generate the processed image, and/or displaying the processed image from the combined data. In embodiments, MEMS actuation can include electrostatic, electrothermal, electromagnetic, piezoresistive, etc.

In another aspect, a system comprises an optic; a sensor array of pixels configured to receive an image for a first frame via the optic when the optic and the sensor array are configured in a first positional relationship, wherein the array of pixels includes at least one bad pixel; and an actuator to move the optic and/or the sensor array based on a position of the at least one bad pixel in the array such that the optic and the sensor array are configured in a second positional relationship; and a processing module to receive the image on the sensor array for a second frame via the optic when the optic and the sensor array are configured in a second positional relationship, and to compensate for a lack of image data from the at least one bad pixel in the sensor array for the first and second frames to output a processed image.

A system can further include one or more of the following features: the processing module is further configured to dynamically update a list of the at least one bad pixel, moving the optic and/or the sensor array based on a position of the at least one bad pixel in the array comprises viewing in a second frame a location in the image that was obscured by the bad pixel in a first frame, moving the optic and/or the sensor array comprises moving the optic with respect to the sensor array, moving the optic and/or the sensor array comprises moving the sensor array with respect to the optic, the sensor array comprises a focal plane array (FPA), the pixels comprise photosensitive diodes, compensating for a lack of image data from the at least one bad pixel in the first and second frames to output a processed image comprises updating information for the locations in the image obscured by the at least one bad pixel every other frame, the at least one bad pixel prevents collection of data from a first location in the image, and wherein the second positional relationship of the sensor array and the optic enables a good pixel to collect data for the first location in the image, moving the optic and/or the sensor array comprises shifting the image at least one pixel in a first axis, moving the optic and/or the sensor array comprises shifting the image at least one pixel in a first axis and at least one pixel in a second axis, the first and second axes are perpendicular, identifying the at least one bad pixel in the sensor array and storing locations of the identified bad pixels, the second positional relationship of the sensor array and the optic avoids locations in the image obscured by a first one of the bad pixels in a first frame from being blocked by different ones of the bad pixels in a second frame, compensating for a lack of image data from the at least one bad pixel in the first and second frames to output a processed image comprises minimizing mechanical movement of the optic and the sensor array between the first and second positional relationships, performing calibration with a calibration image to determine the second positional relationship of the lens and the sensor array, maximizing correlation of the image for the first and second frames based on the calibration image, generating an image shift vector based on locations of the at least one bad pixel and generating a list of good pixels that view areas of the image obscured by the at least one bad pixel in alternate frames, generating a first shift vector for good pixels that view the obscured locations in the image during even frames and generating a second shift vector for good pixels that view the obscured locations during odd frames, displaying for the location in the image obscured by the at least one bad pixel in the second frame, data obtained from a good pixel in the first frame, moving the optic and/or the sensor array such that the optic and the sensor array are configured in one or more additional positional relationships, collecting multiple frames of data for the image prior to moving the optic and/or the sensor array based to the second positional relationship, a piezoelectric actuator to move the optic and/or the sensor array for translating the optic in a direction parallel to a surface of the sensor array, a MEMS actuator to move the optic and/or the sensor array, the MEMS actuator moves the optic in multiple axes, the optic comprises a lens and a steering mirror, the steering mirror comprises a MEMS mirror, moving the steering mirror to change a focal length and/or optical path of the lens, a first region of the image is obscured by the at least one bad pixel in the first positional relationship and a second region of the image is obscured by the at least one bad pixel in the second positional relationship; and wherein compensating for the lack of image data further comprises: combining data from the sensor array of pixels for the first and second frames including using data for the first region of the image from the second frame and using data for the second region of the image from the first frame to generate the processed image, and/or displaying the processed image from the combined data. In embodiments, MEMS actuation can include electrostatic, electrothermal, electromagnetic, piezoresistive, etc.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
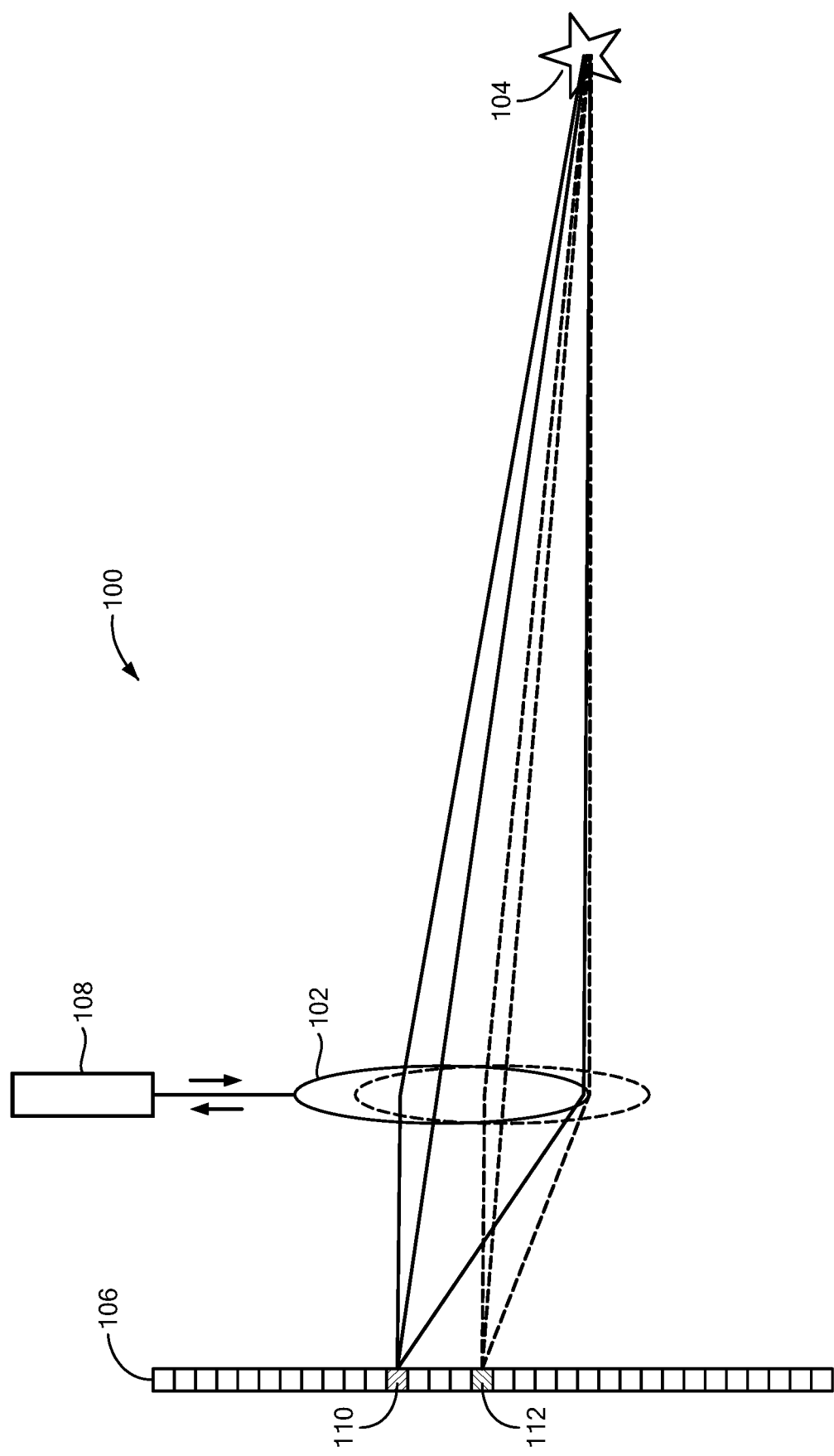
FIG. 1 is a high-level block diagram of an example system for shifting an image with respect to a sensor array to compensate for bad pixels in the array.

Prior to describing example embodiments of the disclosure some information is provided. Laser ranging systems can include laser radar (ladar), light-detection and ranging (lidar), and rangefinding systems, which are generic terms for the same class of instrument that uses light to measure the distance to objects in a scene. This concept is similar to radar, except optical signals are used instead of radio waves. Similar to radar, a laser ranging and imaging system emits a pulse toward a particular location and measures the return echoes to extract the range.

Laser ranging systems generally work by emitting a laser pulse and recording the time it takes for the laser pulse to travel to a target, reflect, and return to a photoreceiver. The laser ranging instrument records the time of the outgoing pulse—either from a trigger or from calculations that use measurements of the scatter from the outgoing laser light—and then records the time that a laser pulse returns. The difference between these two times is the time of flight to and from the target. Using the speed of light, the round-trip time of the pulses is used to calculate the distance to the target.

Lidar systems may scan the beam across a target area to measure the distance to multiple points across the field of view, producing a full three-dimensional range profile of the surroundings. More advanced flash lidar cameras, for example, contain an array of detector elements, each able to record the time of flight to objects in their field of view.

When using light pulses to create images, the emitted pulse may intercept multiple objects, at different orientations, as the pulse traverses a 3D volume of space. The echoed laser-pulse waveform contains a temporal and amplitude imprint of the scene. By sampling the light echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images. In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHz). This process generates digitized waveforms (amplitude versus time) that may be processed to achieve higher-fidelity 3D images.

Of the various laser ranging instruments available, those with single-element photoreceivers generally obtain range data along a single range vector, at a fixed pointing angle. This type of instrument—which is, for example, commonly used by golfers and hunters—either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angle of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the return laser pulses, these instruments obtain a 3D data set (e.g., angle, angle, range)$_n$, where the index n is used to reflect that a series of range-resolved laser pulse returns can be collected, not just the first reflection.

Some 3D lidar instruments are also capable of collecting the intensity of the reflected pulse returns generated by the objects located at the resolved (angle, angle, range) objects in the scene. When both the range and intensity are recorded, a multi-dimensional data set [e.g., angle, angle, (range-intensity)$_n$] is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar systems can include different types of lasers, including those operating at different wavelengths, including those that are not visible (e.g., those operating at a wavelength of 840 nm or 905 nm), and in the near-infrared (e.g., those operating at a wavelength of 1064 nm or 1550 nm), and the thermal infrared including those operating at wavelengths known as the "eyesafe" spectral region (i.e., generally those operating at a wavelength beyond 1300-nm, which is blocked by the cornea), where ocular damage is less likely to occur. Lidar transmitters are generally invisible to the human eye. However, when the wavelength of the laser is close to the range of sensitivity of the human eye—roughly 350 nm to 730 nm—the light may pass through the cornea and be focused onto the retina, such that the energy of the laser pulse and/or the average power of the laser must be lowered to prevent ocular damage. Thus, a laser operating at, for example, 1550 nm, can—without causing ocular damage—generally have 200 times to 1 million times more laser pulse energy than a laser operating at 840 nm or 905 nm.

One challenge for a lidar system is detecting poorly reflective objects at long distance, which requires transmitting a laser pulse with enough energy that the return signal—reflected from the distant target—is of sufficient magnitude to be detected. To determine the minimum required laser transmission power, several factors must be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those reflective objects that are not diffusively-scattering objects), the collimated laser beams can be directly reflected back, largely unattenuated. This means that—if the laser pulse is transmitted, then reflected from a target 1 meter away—it is possible that the full energy (J) from the laser pulse will be reflected into the photoreceiver; but—if the laser pulse is transmitted, then reflected from a target 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the earth to the sun, 10× the number of seconds that have elapsed since Cleopatra was born, or the ratio of the luminous output from a phosphorescent watch dial, one hour in the dark, to the luminous output of the solar disk at noon.

In many cases of lidar systems highly-sensitive photoreceivers are used to increase the system sensitivity to reduce the amount of laser pulse energy that is needed to reach poorly reflective targets at the longest distances required, and to maintain eyesafe operation. Some variants of these detectors include those that incorporate photodiodes, and/or offer gain, such as avalanche photodiodes (APDs) or single-photon avalanche detectors (SPADs). These variants can be configured as single-element detectors, -segmented-detectors, linear detector arrays, or area detector arrays. Using highly sensitive detectors such as APDs or SPADs reduces the amount of laser pulse energy required for long-distance ranging to poorly reflective targets. The technological challenge of these photodetectors is that they must also be able to accommodate the incredibly large dynamic range of signal amplitudes.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal—changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy reduces the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—requires emitting 120,000 pulses [(20*10*60*10)=120,000)]. When update rates of 30 frames per second are required, such as is required for automotive lidar, roughly 3.6 million pulses per second must be generated and their returns captured.

There are many ways to combine and configure the elements of the lidar system—including considerations for the laser pulse energy, beam divergence, detector array size and array format (single element, linear, 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For example—compared to the 3D lidar above—to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eyesafe.

As noted above, while many lidar system operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a closer-by object can be recorded, as well as the range and intensity of later reflection(s) of that pulse—one(s) that moved past the closer-by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the size of the target, and the orientation of the target. Laser returns from close, highly-reflective objects, are many orders of magnitude greater in intensity than the intensity of returns from distant targets. Many lidar systems require highly sensitive photodetectors, for example APDs, which along with their CMOS amplification circuits may be damaged by very intense laser pulse returns.

For example, if an automobile equipped with a front-end lidar system were to pull up behind another car at a stoplight, the reflection off of the license plate may be significant—perhaps $10^{12}$ higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors.

However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

FIG. 1 shows an example sensor system 100 having a signal receiver 102, which is shown as a lens, for focusing received energy from an object 104 in the sensor field of view (FOV) onto an array 106 of sensors. In embodiments, the array 106 comprises a focal plane array (FPA) having a series of photosensitive pixels. An actuator 108 is coupled to the receiver 102 to modify the path of light from the receiver 102 to the FPA 106, as described more fully below. For example, the actuator 108 may move the lens 102 in one or more axes in order to modify the image location on the FPA 106 on a frame-by-frame basis to compensate for the presence of faulty pixels in the array. In the illustrated embodiment, the lens 102 has a first position in which the object 104 is focused on a bad pixel 110 in the FPA 106 and a second position in which the object is focused on a good pixel 112.

It is understood that a focal plane array can refer to any multi-pixel sensor array on which an image is projected, and not just to imaging arrays placed at the focal plane of an optical system. As used herein, the term optic refers to any device that alters the path of light. Example optics include lenses and mirrors.

In an embodiment actuator 108 may comprise a micromachined, or microelectromechanical system (MEMS) actuator. Example actuation mechanisms may include electrostatic, electromagnetic, electrothermal, piezoelectric actuators, and combinations of different actuation types. A lens may be placed on or in a MEMS actuator and moved as needed to direct light to the desired pixel on the receiver 102. Suitable actuators may be used to control the lens position in multiple axes including in plane and out of plane.

Figure 2:
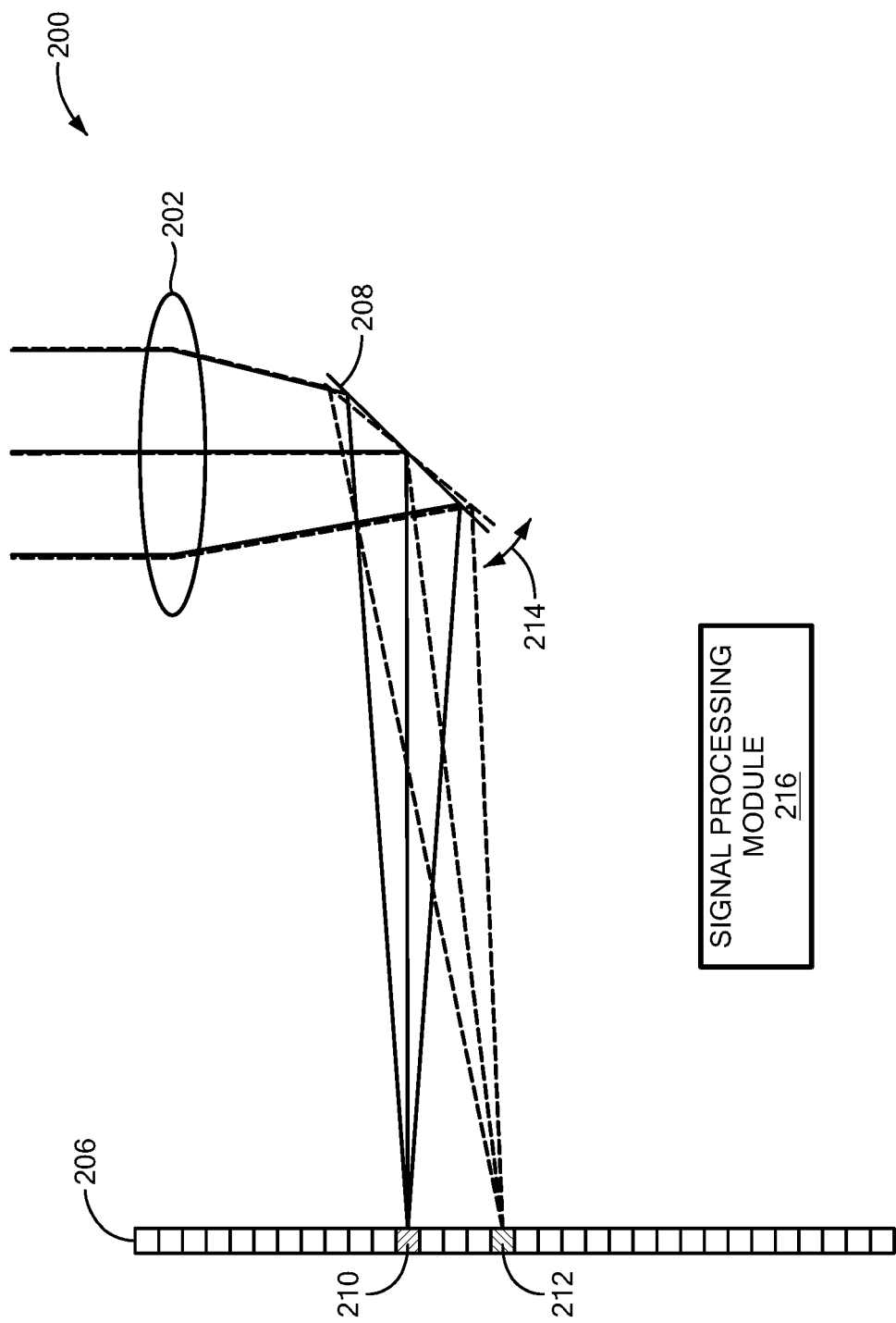
FIG. 2 is a high-level block diagram of a further example system for shifting an image with respect to a sensor array to compensate for bad pixels in the array.

FIG. 2 shows an example sensor system 200 having an optic 202, such as a lens, for focusing received energy from an object (not shown) in the sensor field of view (FOV) onto an FPA 206 where the image location on the FPA is controlled by a steering mirror 208. The steering mirror 208 can be tilted in one or more axes to control the image location on the FPA 206. In the illustrated embodiment, in a first position the steering mirror 208 focuses the object on a bad pixel 210 and in a second position the steering mirror focuses the object on a good pixel 212. In embodiments, the position of the steering mirror 208 can be defined by a tilt angle 214.

In an embodiment, the steering mirror 208 may include a MEMS or micromachined mirror. The mirror may be moved via electrothermal, electromagnetic, electrostatic, or piezoelectric actuation. The mirror 208 may be used to rotate in one axis or in two axes. In another embodiment, the mirror may move in an axis to change the focal length or optical path length of the light, or photon or photons, to be sensed.

A signal processing module 216 can receive and process data from the FPA 206 to compensate for bad pixels, as described more fully below. Based on the data from the FPA 206, the signal processor may control the tilt angle 214 of the mirror 208 to shift the image. In some embodiments, the signal processor 216 may calibrate the sensor system prior to or during operation. The signal processor 216 may generate shift vectors for frame-to-frame image shifting, as described more fully below.

Figure 3:
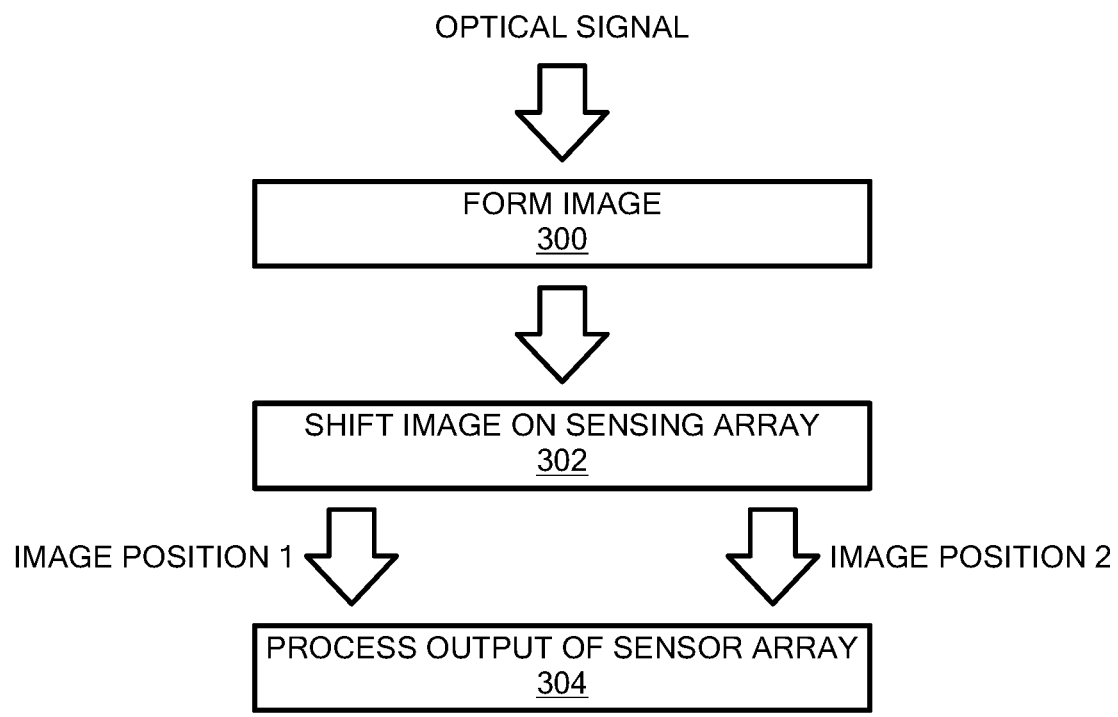
FIG. 3 is a flow diagram showing example steps for compensating for bad pixel(s) in a sensor array.

FIG. 3 shows an example sequence of steps to shift an image for compensating for the presence of bad pixels in a sensor array. In step 300, light is received by a lens for forming an image of a remote object. In step 302, the location of the image on the sensor array, such as an FPA, is shifted. In embodiments, the image can be shifted between a first position and second position on the FPA on a frame-by-frame basis, for example. In embodiments, the FPA has some number of dead pixels. In step 304, the output of the FPA is processed, as described more fully below.

In embodiments, the image is processed to generate an image over multiple frames in which no part of the scene in the sensor FOV is obscured by dead pixel(s).

Figure 4:
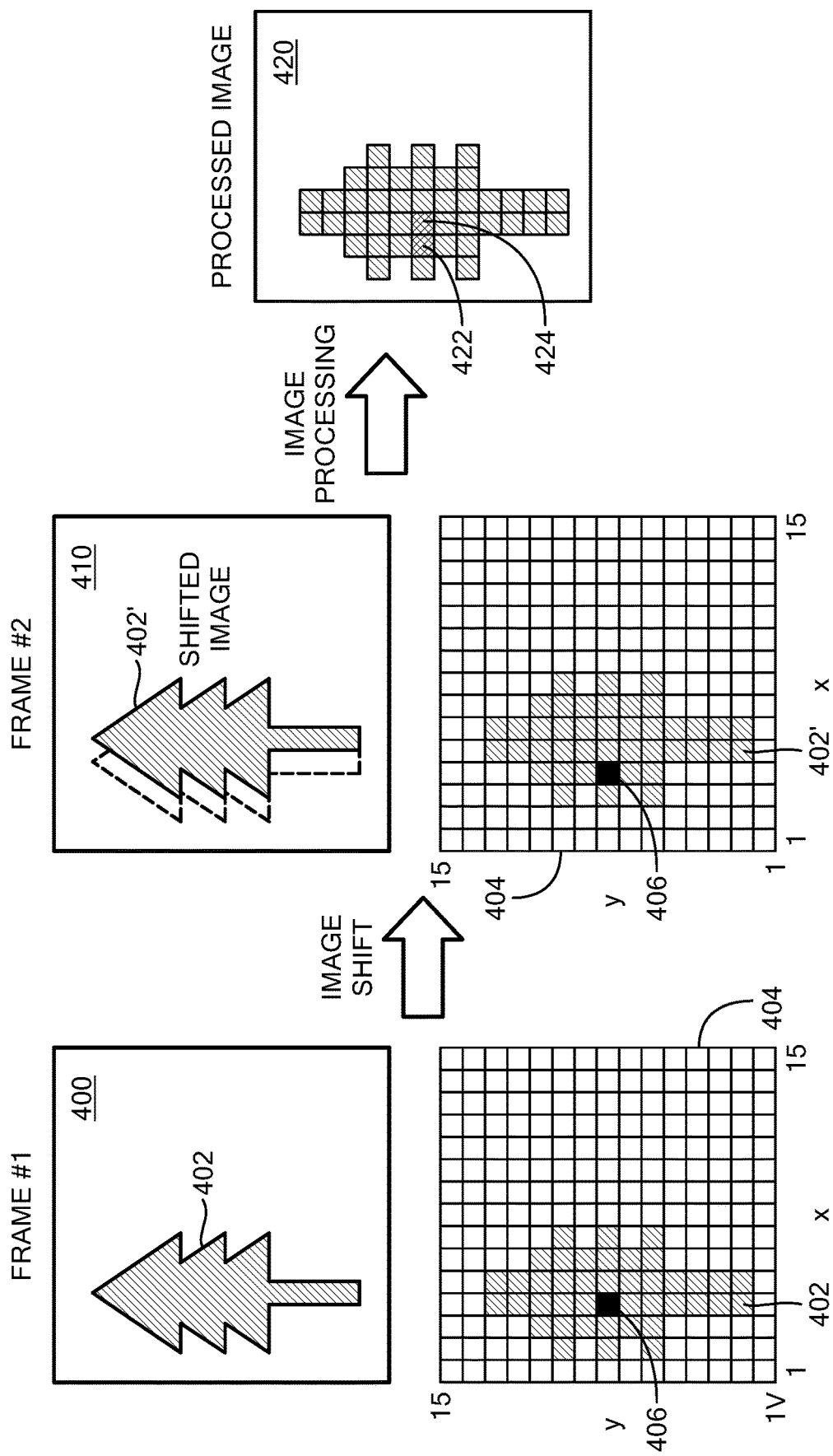
FIG. 4 is a schematic representation showing frame-to-frame image shifting and image processing.

FIG. 4 shows example image shifting and processing in accordance with illustrative embodiments of the disclosure. In a first frame 400, an image 402 in the sensor FOV is formed on an FPA 404. In the illustrated embodiment, the FPA 404 comprises a 15×15 array of photosensitive pixels having a bad pixel 406 at location [4,8] using an x,y coordinate representation.

In a second frame 410, the image 402' is shifted by one pixel along the x axis. After the shift, a different portion of the image 402' is at the location of the bad pixel 406. Information from the shifted and unshifted images can be combined on a frame-by-frame basic to compensate for the lack of information from the bad pixel location.

The information from the first and second frames 400, 410 can be processed to generate a processed image 420 that compensates for the bad pixel 406. In embodiments, the processed image 420 includes first and second pixels 422, 424 for which compensation is performed since information from the location in the image is only received in one of the frames. As discussed above, the first pixel 422 in the processed image 420 received good pixel information in the first frame 410 and bad pixel information in the second frame 420 and the second pixel 424 received bad pixel information in the first frame 410 and good pixel information in the second frame 420. In embodiments, the first and second pixels 422, 424 can use information from adjacent frames providing good pixel information, as described more fully below.

Figure 5C:
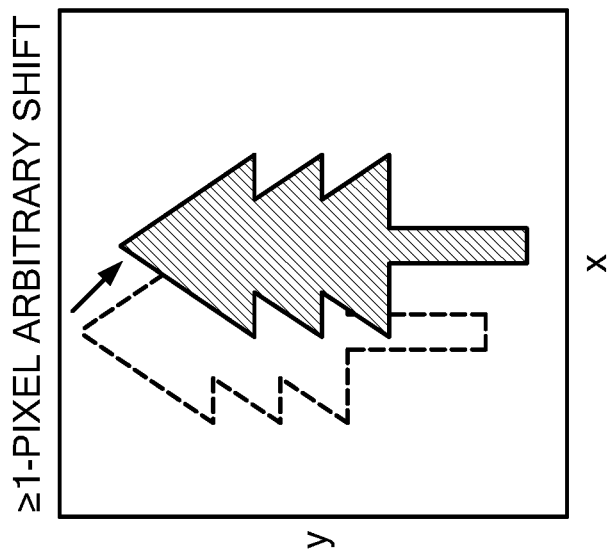
FIG. 5C shows a multi-axis shift of an image with respect to a sensor array.
Figure 5B:
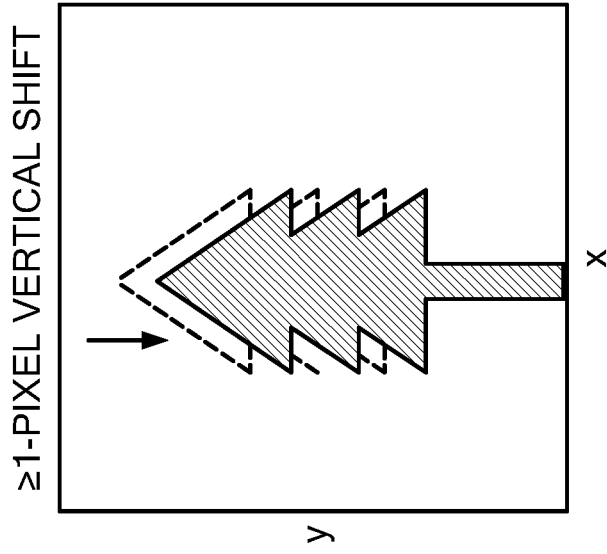
FIG. 5B shows an example vertical shift.
Figure 5A:
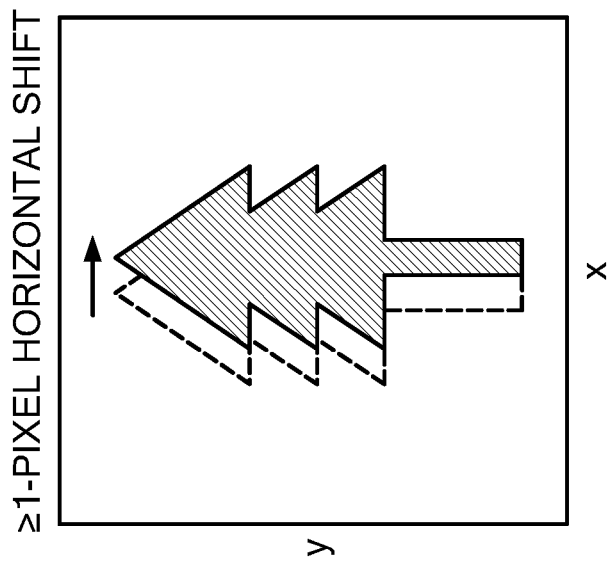
FIG. 5A shows an example horizontal shift.

FIGS. 5A-5C show example image shifting to mitigate the effects of bad pixels in a sensor array. FIG. 5A shows an example horizontal shift, e.g., movement along the x axis, of at least one pixel. FIG. 5B shows an example vertical shift, e.g., movement along they axis, of at least one pixel. FIG. 5C shows an example shift of at least one pixel in the x and y axes.

It is understood that shifting of the image can be performed in multiple axes to compensate for bad pixels in a one or two dimensional pixel array. In general, in the presence of mechanical image shifting, the amount of image shifting should be minimized. It is further understood that any suitable processing technique can be used to determine the direction and magnitude of image shifting to meet the needs of a particular application. In addition, the processing techniques can use any practical number of factors in any practical weighting scheme to determine image shifting.

Figure 6:
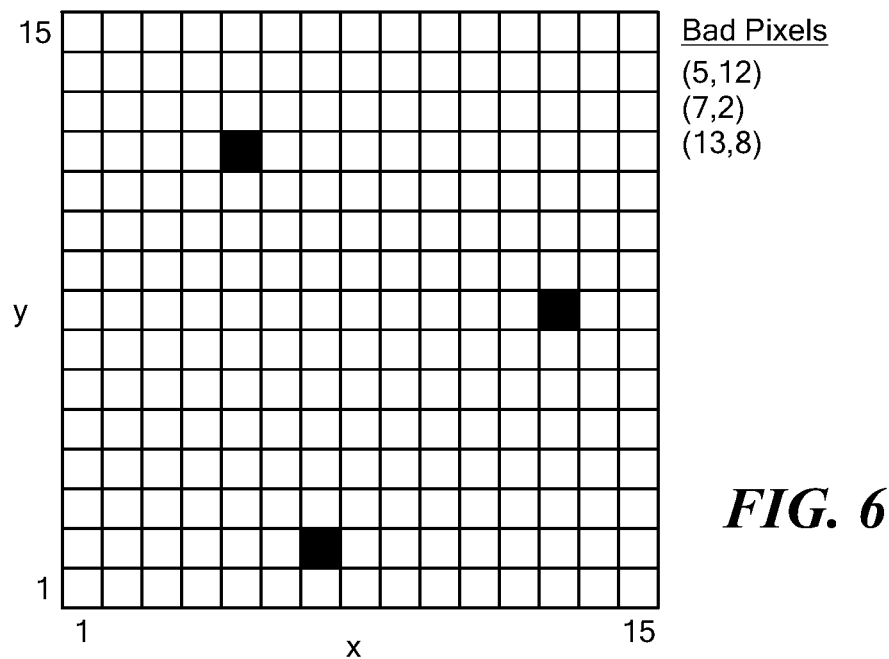
FIG. 6 shows a sensor array having a number of bad pixels identified.

FIG. 6 shows an example initial step in compensating for bad pixels in a sensor array. A sensor is turned on and tested to identify nonresponsive or out-of-family pixels and store a record of bad pixels in nonvolatile memory. Out of family pixels can be identified, for example, by collecting dark frame false alarm rate (FAR) data, attempting non-uniformity correction (NUC) by adjusting pixel bias, and flagging pixels which have <10× lower or >10× higher than average FAR after attempted NUC, for example. This testing can be performed at fabrication or in the field in an ongoing basis to update the list of bad pixels as a sensor ages or is damaged.

In the illustrated embodiment, bad pixels are located at (5,12), (7,2), and (13,8). As discussed above, an image can be displaced to mitigate the effects of the bad pixels.

Image shifting can be performed in variety of embodiments. In some embodiments, an image can be shifted in location on the FPA by a set number of pixels in one or more axes dynamically, statically, randomly, etc. In some embodiments, a detailed image can be used during calibration in combination with a maximization and/or minimization function to determine a shift vector that may be used frame-to-frame. In other embodiments, an instantaneous image can be processed to determine a shift vector. For example, a FOV with no signal of interest, such as no pixel above a threshold level, may not require image shifting. A high value image may be processed at some frame interval, for example, to determine an optimal frame-to-frame image shift to compensate for one or more bad pixels in the image. In addition, pixel information from good pixels neighboring the bad pixel can be used to compensate for the bad pixel. For example, information from at least one good pixel can be stored and used for display of a compensated image in which good pixel data replaces bad pixel data in a display. In other embodiments, an image is shifted in each frame based away from bad pixel locations. In embodiments, a list of bad pixels can be updated from time to time as a sensor ages, for example, so that the list of bad pixels is dynamically updated. In automotive LIDAR applications, for example, where pixels may be damaged when a system on a different vehicle illuminates sensor pixels directly with a laser, or example. Updating a list of bad pixels may extend the useful life of a detector system. In addition, maintaining a list of bad pixels may increase safety levels and may facilitate meeting safety standards, such as ASIL (Automotive Safety Integrity Level) requirements.

Figure 7:
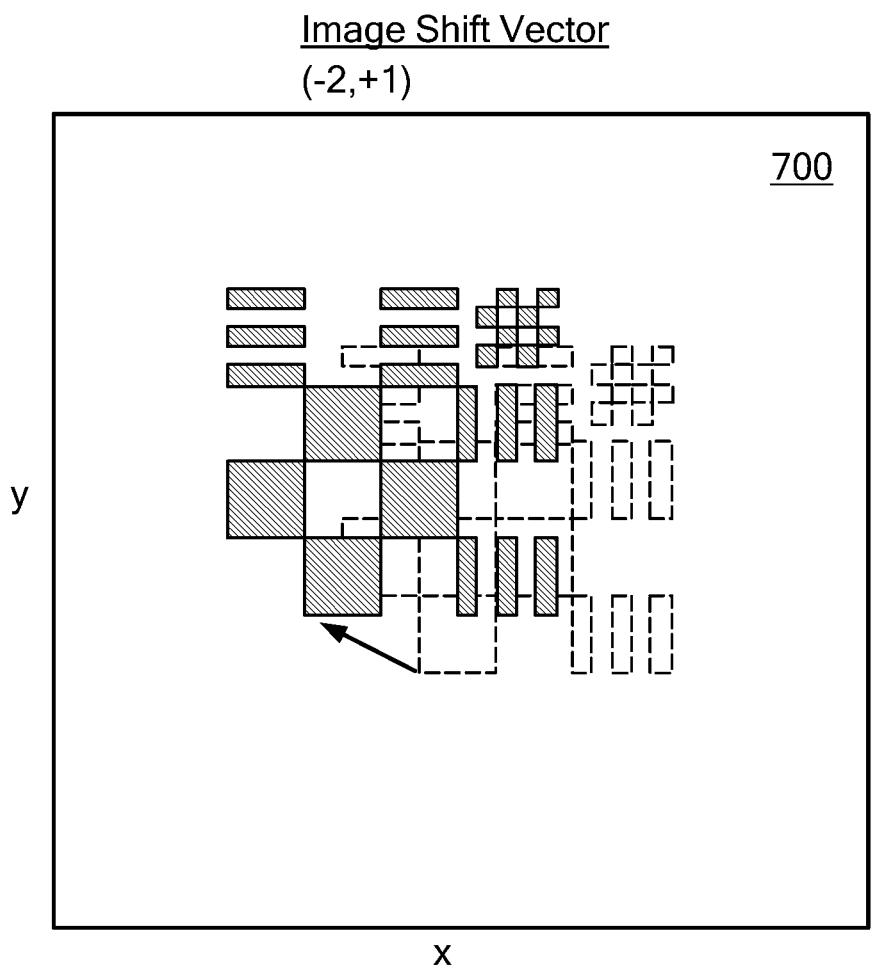
FIG. 7 shows an example image that can be used for calibration.

FIG. 7 shows an example high-contrast fiducial pattern 700 that can be used for image shift calibration. A sensor can be installed in an end-use optical system and an image-shift calibration process can be used to determine a suitable and/or optimum pixel shift scheme that can be stored in nonvolatile memory or other suitable memory. For example, the high-contrast fiducial pattern 700 can be used to solve for a vector translation that maximizes image correlation between alternating frames. In the illustrated embodiment, the shift vector for alternate frames based on the fiducial pattern 700 is (−2,+1). In some embodiments where the optical system is adjustable, the image shift vector components can be adjusted to be as close as possible to an integer number of pixels.

Figure 8:
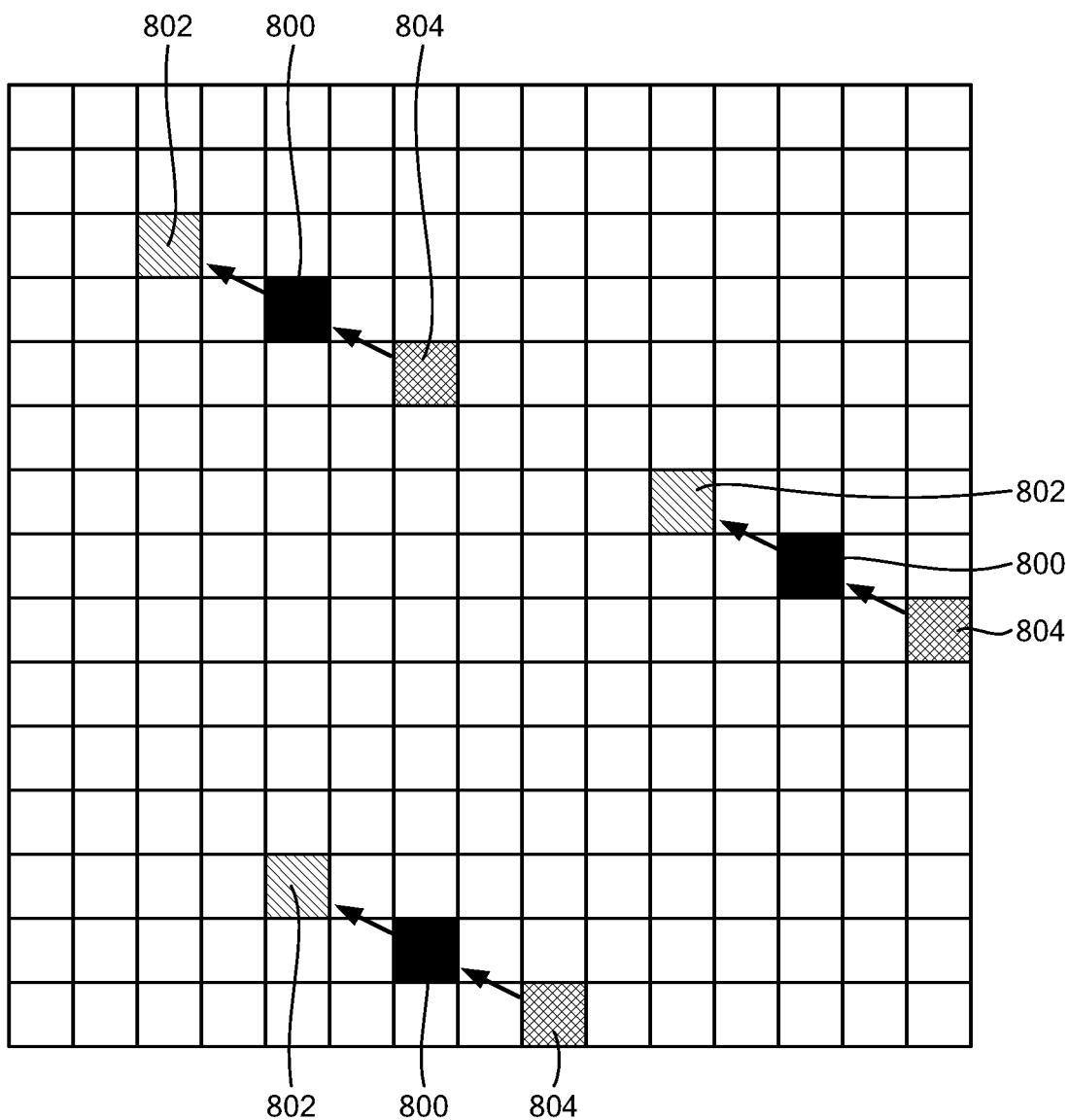
FIG. 8 shows an example sensor array having illustrative even and odd frame image shifting.

FIG. 8 shows an example application of an image shift vector based on a stored list of bad pixels to generate a list of good pixels where view areas are obscured by bad pixels in alternate frames. In an example embodiment, the image shift vector is defined to point from the image location during odd frames and to the shift location during even frames using components $(v_x, v_y)$. The part of the scene obscured by a bad pixel at coordinates $(p_x, p_y)$ in odd frames can be viewed by the pixel at $(p_x+v_x, p_y+v_y)$ in even frames and the part of the scene viewed by a pixel at $(p_x-v_x, p_y-v_y)$ in odd frames will be obscured by the bad pixel in even frames.

In the illustrated embodiment, bad pixels 800 are located at (5,12), (7,2), and (13,8). With a shift vector of (−2,+1) applied, good pixels 802 that view obscured area during even frames are located at (3,13), (5,3), and (11,9). With a shift vector of (+2,−1) applied, good pixels 804 that view the obscured area during odd frames are located at (7,11), (9,1), and (15,7). The good pixels 802, 804 that view areas obscured can be used to compensate for the bad pixels 800.

Sensor processing, such as by camera firmware or software, can efficiently store image data from signals from a bad pixel by addition or subtraction of the image shift vector for image correction.

Figure 9:
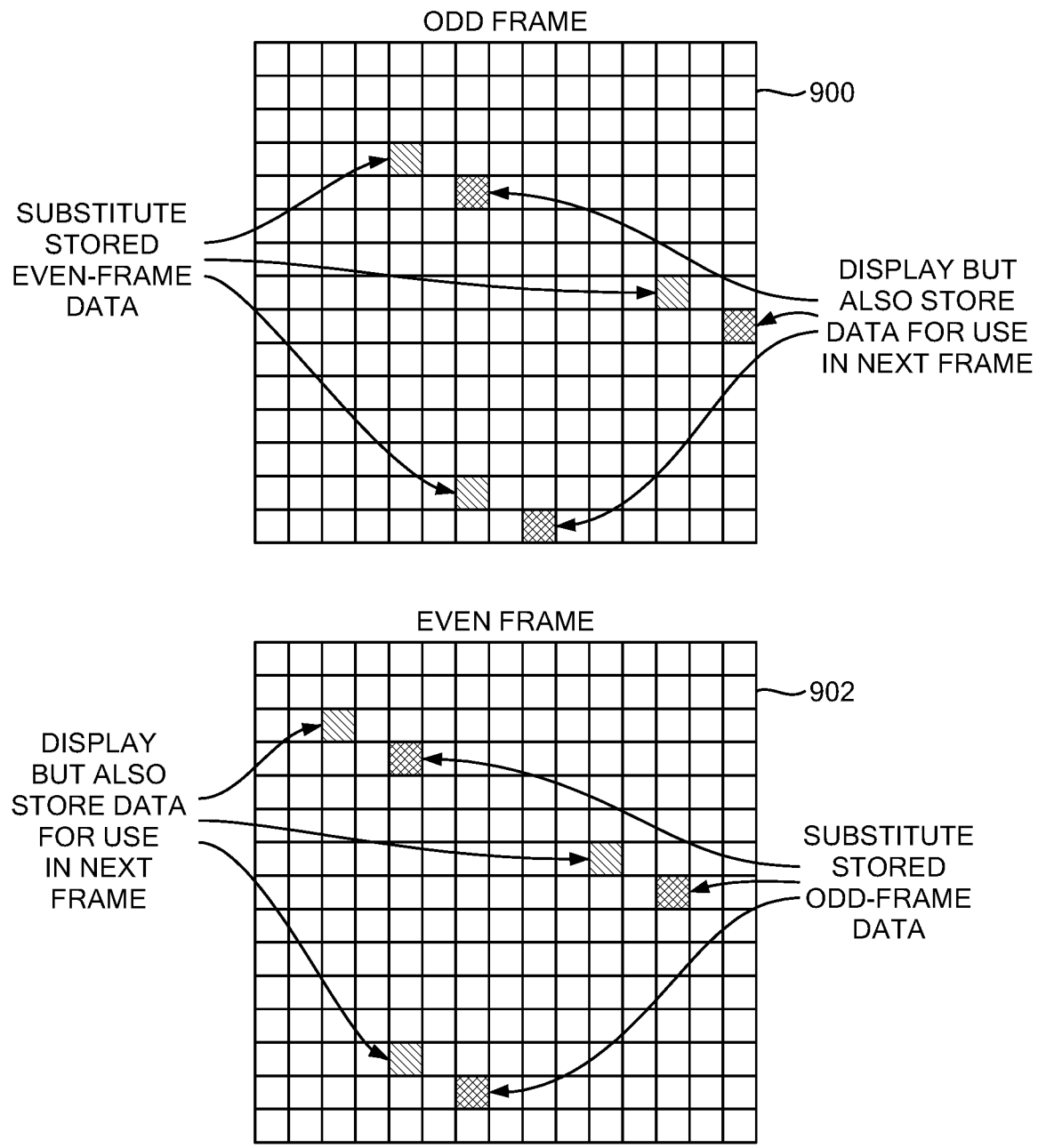
FIG. 9 is a schematic representation of example odd and even frame processing to compensate for a bad pixel.

FIG. 9 shows example odd frame 900 and even frame 902 pixel processing. During sensor operation, image data from odd and even-frame good pixel lists are stored to correct subsequent even and odd frames. A stored image shift vector is used to register even and odd frames for display or further processing and update image areas obscured by bad pixels in any given frame using the prior frame's stored data from the appropriate good pixel list.

It is understood that embodiments of the invention are applicable to a wide range of sensors in which a sensing array has one or more faulty elements, such as an FPA with inoperable pixels. Example applications include LIDAR, LADAR, and still or video optical or thermal cameras.

For example, moving an image seen by the FPA by ≥1 pixel and/or alternating between consecutive frames may enable collection of image data from 100% of a scene using an FPA with a number of bad pixels because the part of the image viewed by a bad pixel will be viewed by a good pixel when the image shifts. The lens and/or FPA can be moved using a variety of suitable mechanisms to meet the needs of a particular application.

In embodiments, a lens can be mounted on a flexure with a piezoelectric actuator that translates the image-forming lens or lens elements in a direction parallel to the FPA. In other embodiments, an image-steering mirror can deflect an angular instantaneous field-of-view (IFOV) with respect to the FPA. It is understood that any suitable mechanism can be used to shift the position of the lens and/or the sensor array with respect to each other.

For a shift of one pixel, the effective field-of-view (FOV) of the dithered sensor is close to that of the full array, e.g., within 0.1% for an FPA with 1000-pixel format in the axis of movement, and an effective resolution of a standard format such as 1024×320 can be serviced with a physical FPA that is only one column of pixels larger, e.g., 1025×320.

In example embodiments, for an image shift of one pixel, specialized scanning optics may not be required for the laser transmitter since its field of illumination is adjusted in the order of about 0.1% to match the physical FPA. In addition, since the image may shift only by one pixel on one axis, the optomechanics used to accomplish the shift may be relatively inexpensive compared to typical scanning optics for lidar.

One skilled in the art will readily appreciate the advantages of achieving 100% scene imaging using an array with operable pixels in the order of about 99.9%. For example, in a particular manufacturing technology for a 128×128-format FPA, the yield of conventional arrays with 100% operable pixels is near zero and the yield of arrays with 99.9% operable pixels is near perfect.

Further, large-format flash lidar with 100% scene coverage can be provided using InGaAs detector arrays, for example, with currently-achieved defect levels. In addition, for the vast majority of pixels, two good measurements will be collected per output data frame, reducing error compared to the single-shot capability of any sensor by simple averaging.

Figure 10:
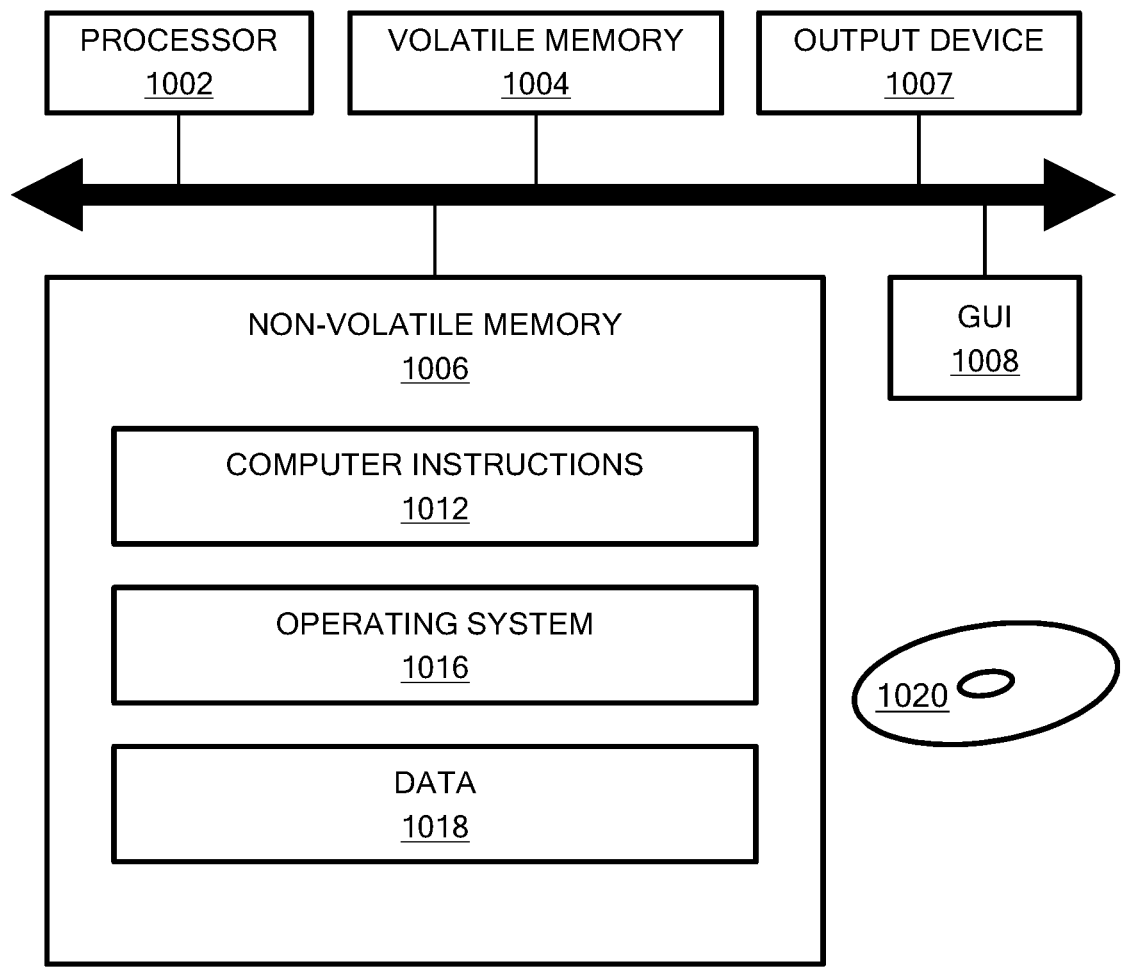
FIG. 10 is a schematic representation of an example computer that can perform at least a portion of the processing described herein.

FIG. 10 shows an exemplary computer 1000 that can perform at least part of the processing described herein. For example, the computer 1000 can perform processing to adjust a lens position and/or sensor array, determine bad pixel location, and/or generate vectors for shifting an image from frame-to-frame, as described above. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
receiving an image on a sensor array of pixels for a first frame via an optic when the optic and the sensor array are configured in a first positional relationship, wherein the array of pixels includes at least one bad pixel;
moving the optic and/or the sensor array based on a position of the at least one bad pixel in the array such that the optic and the sensor array are configured in a second positional relationship;
receiving the image on the sensor array for a second frame via the optic when the optic and the sensor array are configured in a second positional relationship; and
compensating for a lack of image data from the at least one bad pixel in the sensor array for the first and second frames to output a processed image.

2. The method according to claim 1, further including dynamically updating a list of the at least one bad pixel.

3. The method according to claim 1, wherein moving the optic and/or the sensor array based on a position of the at least one bad pixel in the array comprises viewing in a second frame a location in the image that was obscured by the bad pixel in a first frame.

4. The method according to claim 1, wherein moving the optic and/or the sensor array comprises moving the optic with respect to the sensor array.

5. The method according to claim 1, wherein moving the optic and/or the sensor array comprises moving the sensor array with respect to the optic.

6. The method according to claim 1, wherein the sensor array comprises a focal plane array (FPA).

7. The method according to claim 1, wherein the pixels comprise photosensitive diodes.

8. The method according to claim 1, wherein compensating for a lack of image data from the at least one bad pixel in the first and second frames to output a processed image comprises updating information for the locations in the image obscured by the at least one bad pixel every other frame.

9. The method according to claim 1, wherein the at least one bad pixel prevents collection of data from a first location in the image, and wherein the second positional relationship of the sensor array and the optic enables a good pixel to collect data for the first location in the image.

10. The method according to claim 1, wherein moving the optic and/or the sensor array comprises shifting the image at least one pixel in a first axis.

11. The method according to claim 1, wherein moving the optic and/or the sensor array comprises shifting the image at least one pixel in a first axis and at least one pixel in a second axis.

12. The method according to claim 11, wherein the first and second axes are perpendicular.

13. The method according to claim 1, further including identifying the at least one bad pixel in the sensor array and storing locations of the identified bad pixels.

14. The method according to claim 13, wherein the second positional relationship of the sensor array and the optic avoids locations in the image obscured by a first one of the bad pixels in a first frame from being blocked by different ones of the bad pixels in a second frame.

15. The method according to claim 1, wherein compensating for a lack of image data from the at least one bad pixel in the first and second frames to output a processed image comprises minimizing mechanical movement of the optic and the sensor array between the first and second positional relationships.

16. The method according to claim 1, further including performing calibration with a calibration image to determine the second positional relationship of the lens and the sensor array.

17. The method according to claim 16, further including maximizing correlation of the image for the first and second frames based on the calibration image.

18. The method according to claim 1, further including generating an image shift vector based on locations of the at least one bad pixel and generating a list of good pixels that view areas of the image obscured by the at least one bad pixel in alternate frames.

19. The method according to claim 18, further including generating a first shift vector for good pixels that view the obscured locations in the image during even frames and generating a second shift vector for good pixels that view the obscured locations during odd frames.

20. The method according to claim 1, further including displaying for the location in the image obscured by the at least one bad pixel in the second frame, data obtained from a good pixel in the first frame.

21. The method according to claim 1, further including moving the optic and/or the sensor array such that the optic and the sensor array are configured in one or more additional positional relationships.

22. The method according to claim 1, further including collecting multiple frames of data for the image prior to moving the optic and/or the sensor array based to the second positional relationship.

23. The method according to claim 1, further including moving the optic and/or the sensor array using a piezoelectric actuator that translates the optic in a direction parallel to a surface of the sensor array.

24. The method according to claim 1, further including moving the optic and/or the sensor array using a MEMS actuator.

25. The method according to claim 24, wherein the MEMS actuator moves the optic in multiple axes.

26. The method according to claim 1, wherein the optic comprises a lens and a steering mirror.

27. The method according to claim 26, wherein the steering mirror comprises a MEMS mirror.

28. The method according to claim 26, further including moving the steering mirror to change a focal length and/or optical path of the lens.

29. The method according to claim 1, wherein a first region of the image is obscured by the at least one bad pixel in the first positional relationship and a second region of the image is obscured by the at least one bad pixel in the second positional relationship; and
    wherein compensating for the lack of image data further comprises:
    combining data from the sensor array of pixels for the first and second frames including using data for the first region of the image from the second frame and using data for the second region of the image from the first frame to generate the processed image.

30. The method according to claim 29, further including displaying the processed image from the combined data.

31. A system, comprising:
    an optic;
    a sensor array of pixels configured to receive an image for a first frame via the optic when the optic and the sensor array are configured in a first positional relationship, wherein the array of pixels includes at least one bad pixel; and
    an actuator to move the optic and/or the sensor array based on a position of the at least one bad pixel in the array such that the optic and the sensor array are configured in a second positional relationship; and
    a processing module to receive the image on the sensor array for a second frame via the optic when the optic and the sensor array are configured in a second positional relationship, and to compensate for a lack of image data from the at least one bad pixel in the sensor array for the first and second frames to output a processed image.

32. The system according to claim 31, wherein the processing module is further configured to dynamically update a list of the at least one bad pixel.

33. The system according to claim 31, wherein moving the optic and/or the sensor array based on a position of the at least one bad pixel in the array comprises viewing in a second frame a location in the image that was obscured by the bad pixel in a first frame.

34. The system according to claim 31, wherein moving the optic and/or the sensor array comprises moving the optic with respect to the sensor array.

35. The system according to claim 31, wherein moving the optic and/or the sensor array comprises moving the sensor array with respect to the optic.

36. The system according to claim 31, wherein the sensor array comprises a focal plane array (FPA).

37. The system according to claim 31, wherein the pixels comprise photosensitive diodes.

38. The system according to claim 31, wherein compensating for a lack of image data from the at least one bad pixel in the first and second frames to output a processed image comprises updating information for the locations in the image obscured by the at least one bad pixel every other frame.

39. The system according to claim 31, wherein the at least one bad pixel prevents collection of data from a first location in the image, and wherein the second positional relationship of the sensor array and the optic enables a good pixel to collect data for the first location in the image.

40. The system according to claim 31, wherein moving the optic and/or the sensor array comprises shifting the image at least one pixel in a first axis.

41. The system according to claim 31, wherein moving the optic and/or the sensor array comprises shifting the image at least one pixel in a first axis and at least one pixel in a second axis.

42. The system according to claim 41, wherein the first and second axes are perpendicular.

43. The system according to claim 31, further including identifying the at least one bad pixel in the sensor array and storing locations of the identified bad pixels.

44. The system according to claim 43, wherein the second positional relationship of the sensor array and the optic avoids locations in the image obscured by a first one of the bad pixels in a first frame from being blocked by different ones of the bad pixels in a second frame.

45. The system according to claim 31, wherein compensating for a lack of image data from the at least one bad pixel in the first and second frames to output a processed image comprises minimizing mechanical movement of the optic and the sensor array between the first and second positional relationships.

46. The system according to claim 31, further including performing calibration with a calibration image to determine the second positional relationship of the lens and the sensor array.

47. The system according to claim 46, further including maximizing correlation of the image for the first and second frames based on the calibration image.

48. The system according to claim 31, further including generating an image shift vector based on locations of the at least one bad pixel and generating a list of good pixels that view areas of the image obscured by the at least one bad pixel in alternate frames.

49. The system according to claim 48, further including generating a first shift vector for good pixels that view the obscured locations in the image during even frames and generating a second shift vector for good pixels that view the obscured locations during odd frames.

50. The system according to claim 31, further including displaying for the location in the image obscured by the at least one bad pixel in the second frame, data obtained from a good pixel in the first frame.

51. The system according to claim 31, further including moving the optic and/or the sensor array such that the optic and the sensor array are configured in one or more additional positional relationships.

52. The system according to claim 31, further including collecting multiple frames of data for the image prior to moving the optic and/or the sensor array based to the second positional relationship.

53. The system according to claim 31, further including a piezoelectric actuator to move the optic and/or the sensor array for translating the optic in a direction parallel to a surface of the sensor array.

54. The system according to claim 31, further including a MEMS actuator to move the optic and/or the sensor array.

55. The system according to claim 24, wherein the MEMS actuator moves the optic in multiple axes.

56. The system according to claim 31, wherein the optic comprises a lens and a steering mirror.

57. The system according to claim 56, wherein the steering mirror comprises a MEMS mirror.

58. The system according to claim 56, further including moving the steering mirror to change a focal length and/or optical path of the lens.

59. The system according to claim 31, wherein a first region of the image is obscured by the at least one bad pixel in the first positional relationship and a second region of the image is obscured by the at least one bad pixel in the second positional relationship; and wherein compensating for the lack of image data further comprises:

combining data from the sensor array of pixels for the first and second frames including using data for the first region of the image from the second frame and using data for the second region of the image from the first frame to generate the processed image.

60. The system according to claim 59, further including displaying the processed image from the combined data.

* * * * *